United States Patent
Förster

(10) Patent No.: US 10,473,178 B2
(45) Date of Patent: *Nov. 12, 2019

(54) VALVE FOR A VIBRATION DAMPER, VIBRATION DAMPER, AND MOTOR VEHICLE

(71) Applicant: ZF FRIEDRICHSHAFEN AG, Friedrichshafen (DE)

(72) Inventor: Andreas Förster, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 171 days.

This patent is subject to a terminal disclaimer.

(21) Appl. No.: 15/025,487

(22) PCT Filed: Aug. 21, 2014

(86) PCT No.: PCT/EP2014/067792
§ 371 (c)(1),
(2) Date: Mar. 28, 2016

(87) PCT Pub. No.: WO2015/043843
PCT Pub. Date: Apr. 2, 2015

(65) Prior Publication Data
US 2016/0215847 A1    Jul. 28, 2016

(30) Foreign Application Priority Data
Sep. 26, 2013  (DE) .......... 10 2013 219 443

(51) Int. Cl.
*F16F 9/34*   (2006.01)
*F16F 9/19*   (2006.01)
(Continued)

(52) U.S. Cl.
CPC ............. *F16F 9/34* (2013.01); *B60G 13/08* (2013.01); *F16F 9/19* (2013.01); *F16F 9/5126* (2013.01);
(Continued)

(58) Field of Classification Search
CPC ...... F16F 9/092; F16F 9/18; F16F 9/19; F16F 9/34; F16F 9/185; F16F 9/187;
(Continued)

(56) References Cited

U.S. PATENT DOCUMENTS 2,500,708 A * 3/1950 Rossman ............... F16F 9/185
                                                                188/315
4,561,524 A * 12/1985 Mizumukai ............ F16F 9/50
                                                                188/282.4
(Continued)

FOREIGN PATENT DOCUMENTS

DE       27 45 768           4/1978
DE       2745768 A  *        4/1978
(Continued)

OTHER PUBLICATIONS

Englished machined translation of DE-2745768-A, (Description only), [Apr. 20, 1978].*

Primary Examiner — Robert A. Siconolfi
Assistant Examiner — San M Aung
(74) Attorney, Agent, or Firm — Cozen O'Connor

(57) ABSTRACT

Valve for a vibration damper having a valve housing and a valve slide movable in the valve housing to at least partially close at least one flow path of a fluid flowing through the valve. The valve has an input side and an output side. Pressure impingement surfaces of the valve slide are substantially equal for an opening pressure and for a closing
(Continued)

pressure, and the valve slide has a restriction through which a pressure difference between opening pressure and closing pressure can be generated.

17 Claims, 6 Drawing Sheets

(51) Int. Cl.
  *F16F 9/512* (2006.01)
  *B60G 13/08* (2006.01)
(52) U.S. Cl.
  CPC ...... *B60G 2202/24* (2013.01); *B60G 2206/41* (2013.01); *F16F 2236/04* (2013.01); *F16F 2238/04* (2013.01)
(58) Field of Classification Search
  CPC .... F16F 9/3257; F16F 9/5126; F16F 2236/04; F16F 2238/04; B60G 13/08; B60G 2202/24; B60G 2206/41
  USPC .......................... 188/315, 322.2, 318, 322.14
  See application file for complete search history.

(56) References Cited

U.S. PATENT DOCUMENTS

| | | | | |
|---|---|---|---|---|
| 5,261,448 A | * | 11/1993 | Furuya | B60G 17/08 137/513.5 |
| 5,992,585 A | * | 11/1999 | Kazmirski | F16F 9/34 188/315 |
| 2005/0133319 A1 | * | 6/2005 | Wilhelm | F16F 9/5126 188/281 |
| 2012/0247890 A1 | * | 10/2012 | Murakami | F16F 9/32 188/282.1 |
| 2015/0027829 A1 | * | 1/2015 | Nowaczyk | F16F 9/50 188/313 |

FOREIGN PATENT DOCUMENTS

| | | | | |
|---|---|---|---|---|
| DE | 10 2004 054474 | | 6/2006 | |
| DE | 10 2005 048949 | | 12/2006 | |
| FR | 2 960 275 | | 11/2011 | |
| FR | 2960275 A1 | * | 11/2011 | |
| JP | 62177331 A | * | 8/1987 | ............... F16F 9/46 |
| JP | 62177331 A | * | 8/1987 | |
| JP | 01109114 A | * | 4/1989 | ........... B60G 17/015 |
| JP | 01109114 A | * | 4/1989 | |
| WO | WO 00/52354 | | 9/2000 | |

* cited by examiner

VALVE FOR A VIBRATION DAMPER, VIBRATION DAMPER, AND MOTOR VEHICLE

CROSS REFERENCE TO RELATED APPLICATIONS

This is a U.S. national stage of application No. PCT/EP2014/067792, filed on Aug. 21, 2014. Priority is claimed on German Application No. DE102013219443.9 filed Sep. 26, 2013, the content of which is incorporated here by reference.

BACKGROUND OF THE INVENTION

1. Field of the Invention

The invention is directed to a valve for a vibration damper comprising a valve housing and a valve slide movable in the valve housing for at least partially closing at least one flow path of a fluid flowing through the valve, this valve having an input side and an output side.

2. Description of the Prior Art

It is known to use valves in vibration dampers. In two-tube vibration dampers, there is usually a base valve at the bottom of the working cylinder. Further, the piston can have a piston valve. In this case, the valves are compression valves.

It is further known to provide two-tube dampers with an adjustable damping force so that a damping force generating device outside of the two-tube damper is fluidically connected to the interior of the two-tube damper. The resistance to the fluid can be adjusted at this damping valve to control the damping force of the vibration damper.

To produce damping valves of this type more economically it is necessary to limit the volume flow through the damping valve. Of course, flow valves for influencing the flow of a fluid are already known. In particular, there are two-way flow control valves, three-way flow control valves, or flow-dividing valves. But known flow valves cannot be utilized for the targeted application in a vibration damper because they are either electrically operated or, by reason of their manner of operation, cannot be controlled purely as a function of volume flow.

A vibration damper with adjustable damping force in which an additional damping valve is arranged upstream of an adjustable damping valve is known from DE 102004054474 B3. In this way, suddenly occurring maximum pressures, such as when driving over a bump, can be contained and kept away from the adjustable damping valve.

SUMMARY OF THE INVENTION

It is an object of the present application to provide a valve which can be operated in a purely mechanical manner and controlled substantially depending on volume flow and, therefore, independent of pressure so that a device that is connected to the vibration damper such as a damping valve can be operated with a maximum volume flow.

The pressure impingement surfaces of the valve slide are substantially the same size for an opening pressure and for a closing pressure, and the valve slide has a restriction through which a pressure difference between opening pressure and closing pressure can be generated.

Referring to the flow direction, the opening pressure is present at the input side and the closing pressure at the output side. Input side and output side refer to the regions inside and outside of the valve slide which are above and below the restriction or, when installed horizontally, lateral to the restriction. Those areas that are arranged facing the piston as viewed from the restriction after the valve has been installed in a vibration damper are located on the input side and those areas that are correspondingly arranged remote of the piston are located on the output side. In this regard, it is assumed that the vibration damper is in the compression stage and the fluid of the vibration damper accordingly has a definite flow direction.

Accordingly, the pressure impingement surfaces are those cross-sectional areas diametrical to the restriction as a projection on the cross-sectional area in direction of the longitudinal axis or movement direction of the valve slide. The pressure impingement surfaces must be substantially equal in size, i.e., the projected surfaces contain the same, or only slightly different, surface area. In particular, this does not mean that the valve slide must be constructed symmetrically above and below or lateral to the restriction; rather, the inner walls can be shaped differently on the input side and output side. Also, no other kinds of symmetries are necessary in axial direction; the valve slide is preferably formed so as to be rotationally symmetrical. A uniform pressure distribution and pressure impingement can be achieved in this way.

Further, it is preferably provided that the valve slide has a basically hollow-cylindrical shape. The valve slide separates an interior space from an exterior space. It is not necessary that the inner wall or walls or the outer wall have any particular shape. In particular, the walls need not be "smooth".

The pressure impingement surfaces preferably occupy less than one half and more than one fourth of the total cross-sectional area of the valve slide. In a particularly preferred manner, the pressure impingement surfaces occupy more than one third of the total cross-sectional area of the valve slide and, more preferably, more than 40 percent of the total cross-sectional area of the valve slide.

The pressure difference that can be generated between opening pressure and closing pressure through the restriction first takes place, of course, when fluid is flowing. Without movement of the fluid, there is no pressure difference between the input side and output side of the valve.

The valve slide has an individual restriction for generating a pressure difference between opening pressure and closing pressure. Therefore, this restriction is preferably arranged in the central region of the valve slide. Preferably, the restriction is provided between a top fourth and a bottom fourth of the valve slide.

In an advantageous manner, the valve slide can be pretensioned by a force accumulator, particularly a spring. The valve slide of the valve, which is controlled as a function of volume flow, is displaceable in the valve housing. The valve slide must have a preferred position so that the valve slide has a fixed initial position, i.e., the valve slide is always to be found in a definite position when put into operation. This preferred position can be predefined by the force accumulator. The force exerted by the force accumulator should be at least sufficient to fix the valve slide in the preferred position against friction and, depending on the installed position, also against its own weight force. The pretensioning force of the force accumulator can also be used to affect how large the volume flow must be to move the valve slide out of the normal operating position. The force accumulator is preferably supported against the valve housing. The valve housing can be formed of one, two, or more parts. The spring is pretensioned between the valve slide and that part of the valve housing that is remote of the preferred position insofar as a compression spring is concerned or on the side of the preferred position when a tension spring is used. Of course, these considerations also apply to other types of force accumulators. What is crucial is whether the force accumulator exerts a tensioning force or a compressing force.

The preferred position of the valve slide is the normal operating position of the valve. Since the opening pressure and the closing pressure on the pressure-impinged surfaces substantially compensate for one another in normal operation, i.e., in the normal operating position of the valve slide, the valve slide remains in the preferred position until the volume flow through the valve slide exceeds a threshold value so that the differential pressure between the input side and the output side pushes the valve slide out of the normal operating position and moves it in direction of the overload position. In principle, the valve slide is selectively displaceable between the normal operating position and the overload position.

The restriction is advantageously formed as a circular narrowing. Accordingly, the inner diameter of the valve slide narrows at a certain axial height, this reduced inner diameter comprising a predefined, contiguous portion. In principle, the narrowing can be formed in a stepped manner, but the valve slide is preferably formed to narrow conically toward the restriction on the input side. Following the restriction, the inner diameter preferably does not increase uniformly, but rather the slope of the inner wall initially increases and then decreases. Owing to the abruptly increasing inner diameter of the valve slide after the restriction, the pressure difference between the opening pressure and the closing pressure can be greater than it would be if the inner diameter increased in a uniform manner after the restriction.

It should be mentioned that the restriction need not be formed as a narrowing. For example, the restriction can also be realized as a plate with bores located in the valve slide. However, this variant has the disadvantage that the volume flow is impeded no matter what the volume in the flow, and production is more elaborate compared to the previously described embodiment.

The valve slide can preferably have a larger flow area at the output side in a first operating position, particularly a normal operating position, and a smaller flow area in a second operating position, particularly an overload position. In this way, the flow resistance of the fluid can be controlled. With a larger flow area, the fluid encounters less resistance and can accordingly flow unimpeded. Decreasing the flow area in the overload position increases the flow resistance; further, the volume flow is limited to a maximum value.

The walls of the valve slide on the output side can preferably have at least one recess. This recess, which goes through the entire wall, ensures that even in the overload position an opening through which the fluid can flow always remains open. In this way, at least one volume flow set by the size of the recess is always admitted to the damping valve. The recess can be provided in the manner of a notch or slit at the underside of the wall of the valve slide, but can also be inserted in the wall of the valve slide in the manner of a window so that the valve slide is closed at the lower edge. Ultimately, the position of the recess depends inter alia on the flow path of the fluid.

In an advantageous manner, the valve slide has at least two recesses, and these recesses are arranged symmetrically. With a symmetrical arrangement of the recesses, the valve slide—and therefore the valve—is more balanced with respect to pressure compared to an asymmetrical arrangement, which is why a symmetrical arrangement is preferred. Depending on the size and arrangement of the recesses, a quantity of six to eight recesses is particularly advantageous.

The valve housing is preferably supported on at least two feet that extend from the outer edge of the valve housing to the center of the valve housing. Because the feet do not reach to the inner edge of the housing, a radial free space always remains around the valve slide so that recesses at the output side of the valve slide never overlap with the feet, which could in turn inhibit the flow of fluid. Preferably, the center of the valve housing is offset somewhat toward the radially inner side compared to the outer edge of the top housing portion of the valve housing. Accordingly, the same area that is also supported on the valve housing above the valve housing remains accessible for the fluid below the valve housing. In this way, in addition to the radial free space with respect to the recesses of the valve slide, a pressure balance of the valve housing can be achieved.

Preferably, a main flow path that can be closed by the valve slide can be fluidically connected as flow path with the output side of the valve; that is, the main flow path is considered to be that path which follows the valve and valve slide on the output side. Therefore, the above-described preferred position for the valve slide, and, therefore, also the normal operating position, is a positioning of the valve slide remote of the output side; accordingly, a force accumulator for pretensioning the valve slide is supported between an input-side portion of the valve slide and an output-side portion of the valve housing insofar as the force accumulator is compressive. In case of a tensile force accumulator such as a tension spring, however, this force accumulator would be arranged between an output-side portion of the valve slide and an output-side portion of the valve housing.

In an advantageous manner, a bypass path, which can be closed by the valve slide, can be fluidically connected as a flow path in the input side of the valve. Instead of a bypass path, a pressure limiting valve, for example, could also be provided in the piston so that the fluid is conducted through the piston when a valve is in the overload position and, therefore, with rising pressure. However, a pressure limiting valve in the piston assumes that a higher pressure can be built up. Since the existing pressure and the volume flow are linked, the value, which is accordingly predetermined through the damping force generating device via the volume flow, is so small that the pressure limiting valve must already operate in a pressure range in which it should actually not yet be operative. The bypass path accordingly offers the advantage that on the one hand the piston can be constructed in a simplified manner and on the other hand it is accordingly possible to divert merely the surplus portion of the volume flow without the need for any changes to take place above the valve.

In particular, the valve slide can also be displaceable in such a way that it merely opens and closes the bypass path depending on the volume flow flowing through the valve slide and leaves the main flow path unchanged. For this purpose, the valve slide in the overload position can be supported at a stop on the output side, and the flow area of the main flow path is not reduced or not substantially reduced. This is also achieved when the valve slide is supported by feet on the base of the main flow path insofar as the cross section of the latter reduces the flow area only negligibly.

Preferably, at least one guide of the valve slide can have at least one recess connecting the bypass path and a space in which the guide can be raised and lowered with the slide. The guide can be constructed, for example, as an outer ring on the outside of the valve slide. The guide is preferably positioned on the input side of the valve slide. In this case, the valve slide has an individual guide. But it is also possible, of course, to provide as a guide, for example, a plurality of projections which are guided into guide grooves. If an annular guide of this kind is flattened in a symmetrical manner, for example like a tetrahedron, in that the annular structure is flattened at four positions of the guide which are organized symmetrically with respect to one another, the bypass path is connected to the space below the guide. This space is to be provided when the above-described guide is used because the guide is raised and lowered when the valve slide moves from the normal operating position into the overload position and back again, and a corresponding space must be provided for this purpose. This space can also be adjoined, for example, by the space for accommodating the force accumulator provided the normal operating position lies toward the input side and the force accumulator is a compression spring. By connecting the bypass path to this space, a pressure balance is also achieved in radial direction of the valve slide so that the valve is pressure-balanced in this direction as well.

Advantageously, a pressure limiting valve can be arranged in the bypass path. This pressure limiting valve is preferably constructed as a check valve which is pretensioned in closing direction. Accordingly, the bypass path also has a certain flow resistance so that not all of the fluid volume flows off via the bypass path when the valve slide moves into the overload position and only a vanishingly small portion still remains on the main flow path.

Rather, a constant, maximum required volume or maximum volume flow continues to flow through the recesses at the output side of the valve slide. In this embodiment, the valve is a seat valve with downstream valve in the bypass path.

In addition, one aspect of the invention is directed to a vibration damper for a motor vehicle that has a valve such as that described. All of the embodiments of the valve can also be transferred in a corresponding manner to a vibration damper comprising a corresponding valve.

Preferably, the vibration damper can have three tube elements arranged one inside the other, and a displaceable piston is arranged in the innermost tube element, the valve is arranged in or at the innermost tube element, and the center tube element separates a main flow path from a bypass path, which main flow path and bypass path are fluidically connected to the interior of the innermost tube element. As was explained in the beginning, the valve which has been extensively described above is provided for a vibration damper, but the specific construction of this vibration damper does not depend on the construction of the valve. The constructional composition of the vibration damper is arrived at in that the vibration damper comprises three tube elements in coaxial arrangement with respect to one another. The construction is similar to a two-tube damper with intermediate tube, but there is no gas in the exterior space of the present vibration damper so that this space does not represent a compensation space. Further, the central volume and outer volume are preferably connected to the working space, i.e., the space in the inner tube element, such that the fluid flowing in the main flow path and in the bypass path can be returned again to the working space, specifically above the piston, The compensation space can be arranged lateral to or below the tube elements, but can also be part of the three tube elements. In particular, the compensation space can be arranged on the side of the valve remote of the piston.

A damping force generating device can preferably be arranged in the main flow path. As was described above, this damping force generating device must be protected against excessively large volume flows, which is achieved by means of the valve.

The invention is also directed to a motor vehicle comprising a vibration damper such as that described.

BRIEF DESCRIPTION OF THE DRAWINGS

Further embodiments, details and features are indicated in the embodiment examples and figures described in the following. The drawings show.

DETAILED DESCRIPTION OF THE PRESENTLY PREFERRED EMBODIMENTS

Figure 1:
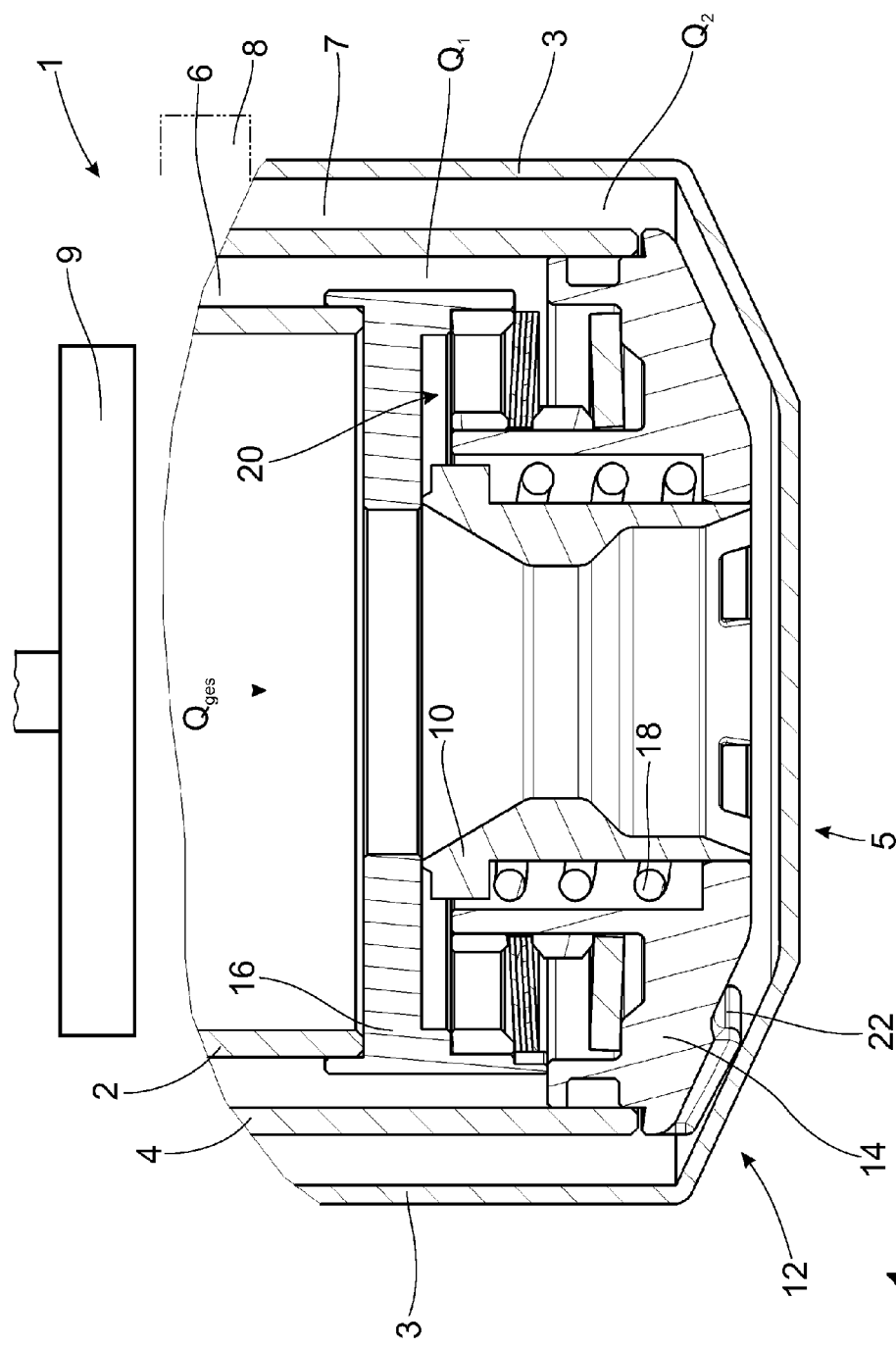
FIG. 1 is a portion of a vibration damper in longitudinal section.

FIG. 1 shows a portion of a vibration damper 1 with an inner tube element 2, an outer tube element 3, a center tube element 4 arranged between the inner tube element 2 and outer tube element 3, and a valve 5. A bypass path 6 is located between the inner tube element 2 and center tube element 4, and a main flow path 7 is located between the center tube element 4 and outer tube element 3. A damping force generating device, e.g., a damper valve 8, which is to be protected against excessively large volume flows, is located in the main flow path 7 or in the fluidic connection to the main flow path 7. A piston 9, which either works as a simple displacer or which has a compression valve that opens under very high pressures, is provided in the inner tube element 2. The valve 5 substantially comprises a valve slide 10, a valve housing 12 comprising housing parts 14 and 16, a spring 18, a pressure limiting valve 20, and feet 22.

Figure 2:
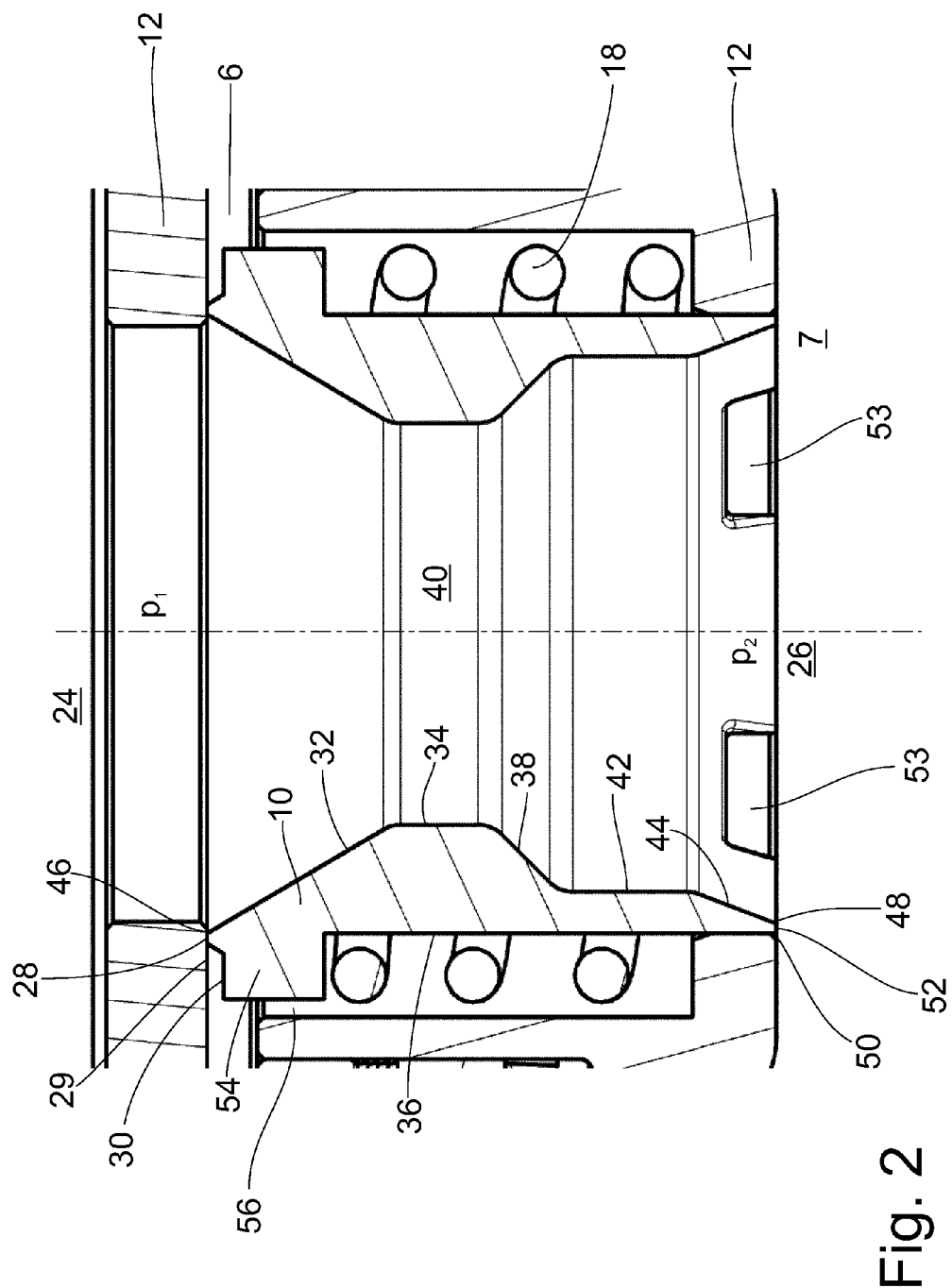
FIG. 2 is a valve slide.

FIG. 2 shows the valve slide 10 in more detail. The valve slide 10 has an input side 24 on the piston side and an output side 26 remote of the piston. The terms "piston side" and "remote of the piston" refer to the valve 5 in installed state in a vibration damper 1. In the following, the valve slide will be described from the input side 24 toward the output side 26. The top of the valve slide 10 is formed by surfaces 28, 30, and 32. Surface 28 is on a narrow annular projection that leads towards the outer side to a surface 30 which is likewise annular. Surface 28 is the valve surface of the valve 5 constructed as a seat valve. Toward the inside, surface 32 forms a conically narrowing funnel that opens into the side surface 34. Surface 38 follows the side surface 34 extending parallel to the outer side 36. Surface 38 has a greater slope relative to side surface 34 than surface 32; that is, surface 38 and side surface 34 form a smaller angle than that formed by surface 32 and side surface 34. In other words, the narrowing formed by the restriction 40 becomes wider again more quickly on the output side 26 than on the input side 24. In this way, the pressure difference between input side 24 and output side 26 can be controlled.

On the output side 26, surface 38 is followed by side surface 34 and surface 44.

FIG. 2 shows the following characteristics for pressure-balancing the valve 5.

The inner edge 46 of the valve slide 10 lies in a (longitudinal) plane with the outer side 36. This is the same plane in which the valve slide 10 terminates outwardly on the output side 26. Accordingly, the surfaces impinged by the opening pressure $p_1$ and the closing pressure $p_2$ are the same size. The pressure impingement surfaces can be determined through a projection of the cross section on a plane perpendicular to the longitudinal axis or movement direction of the valve slide 10. In other words, as long as the inner diameter and outer diameter of the two pressure impingement surfaces are equal, they are impinged equally with the same opening pressure $p_1$ and closing pressure $p_2$ regardless of the slope of surfaces 32, 38 and 44. In this embodiment of the valve slide 10, however, a pressure difference is produced by the volume flow flowing through the valve slide 10. This results in the following manner:

The resulting force on the slide F equals the difference between the opening pressure $p_1$ and the closing pressure $p_2$ which are multiplied, respectively, by the pressure-impinged surface. The pressure impingement surface $a_1$ for the opening pressure $p_1$ can be determined by the diameter of the valve slide 10 on one side at the height of surface 28 (diameter $d_{sf}$) and at the height of side surface 34 (diameter $d_{si}$). In other words, the diameters at the valve surface, in this case the outer diameter of surface 28, and at the restriction 40 are to be used to calculate area $a_1$. Using simple geometric circle calculations, area $a_1$ is accordingly equal to the difference between a larger-area circle at the height of surface 28 and a smaller circle at the height of side surface 34. Equal diameters are used in calculating pressure impingement surface $a_2$ of closing pressure $p_2$ so that areas $a_1$ and $a_2$ are equal. This results as follows: to calculate the pressure-impinged surface $a_2$ during closing pressure $p_2$, diameter $d_{si}$ at restriction 40 is used on the one hand as for the opening pressure $p_1$, and the diameter defined by the outer edge 50 of surface 52 is used on the other hand. Owing to the fact that fluid and therefore pressure also impinges on surface 52, the diameter to be utilized is defined by the outer edge 50 of surface 52 and not by the inner edge 48, which is also possible in principle. Accordingly, however, diameters that are exactly equal to those used for calculating the pressure impingement surface $a_1$ enter into the calculation of pressure impingement surface $a_2$. Therefore, a pressure difference results only by reason of the volume flow of the moving fluid, and this pressure difference depends on the diameter or cross-sectional area $a_4$ of the restriction 40.

On the output side, the valve slide 10 has a plurality of recesses 53. These recesses 53 can be passages from the underside of the valve slide 10, as is shown here, but can also be arranged as a type of window at some distance from the underside so that the valve slide 10 is closed on the underside. Of course, the recesses 53 extend through the wall of the valve slide so that there is always a minimum volume flow even in the overload position. Valve slide 10 is arranged in the normal operating position in FIG. 1 and in FIG. 2. This preferred position results from the pretensioning by spring 18. In the embodiment according to FIGS. 1 and 2, the normal operating position is characterized in that the valve surface, i.e., surface 28, is pressed against the opposite surface, namely, the valve seat surface 29. The bypass path 6 is closed in this position.

On the input side 24, the valve slide 10 has an annular guide 54 with a plurality of axially penetrating recesses 56. As a result of the recesses 56, the fluid in the bypass path 6 communicates with the annular space outside of the valve slide 10. There is also a certain hollow space resulting from the lift path of the guide 54 during the movement of the valve slide 10 also without the spring 18 being arranged below the guide 54. When the spring 18 is arranged between guide 54 and valve housing 12, this hollow space is larger on the outer side 36 of the valve slide. The connection of the bypass path 6 and the space on the outside of the valve slide 10 ensures a defined pressure in this space outside of the valve slide 10. This further improves the pressure balance of the valve 5. Further, the recesses 56 have a defined cross section for damping the movement of the valve slide 10 during greater changes in volume flow.

Figure 3:
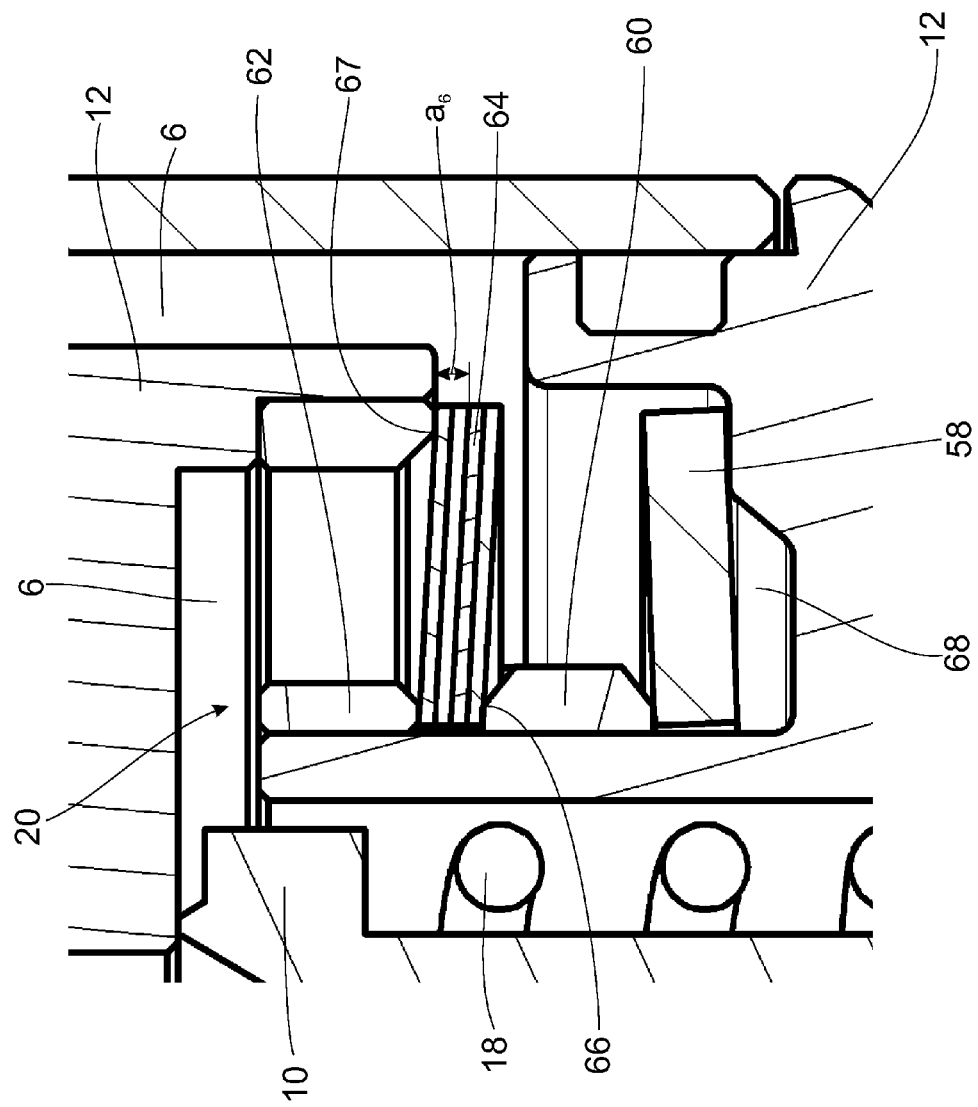
FIG. 3 is a pressure limiting valve.

FIG. 3 shows the pressure limiting valve 20 according to FIG. 1 in detail. The pressure limiting valve 20 is formed as a check valve which is pretensioned in closing direction. Pressure limiting valve 20 comprises at least one elastically deformable disk 58, two rings 60 and 62 and a disk package 4. The ring 60 is supported on the elastically deformable disk 58, and the disk package 64 is fixed between rings 60 and 62. The deviation point 66 of the ring 60 is located such that an opening pressure of several bar, preferably between 2 bar and 15 bar, must be overcome before the fluid flows through the bypass path 6, which prevents the pressure from dropping abruptly at the damping valve 8 in the main flow path 7 when the bypass path 6 opens.

An oil reservoir 68 is provided below the elastically deformable disk 58.

Figure 4:
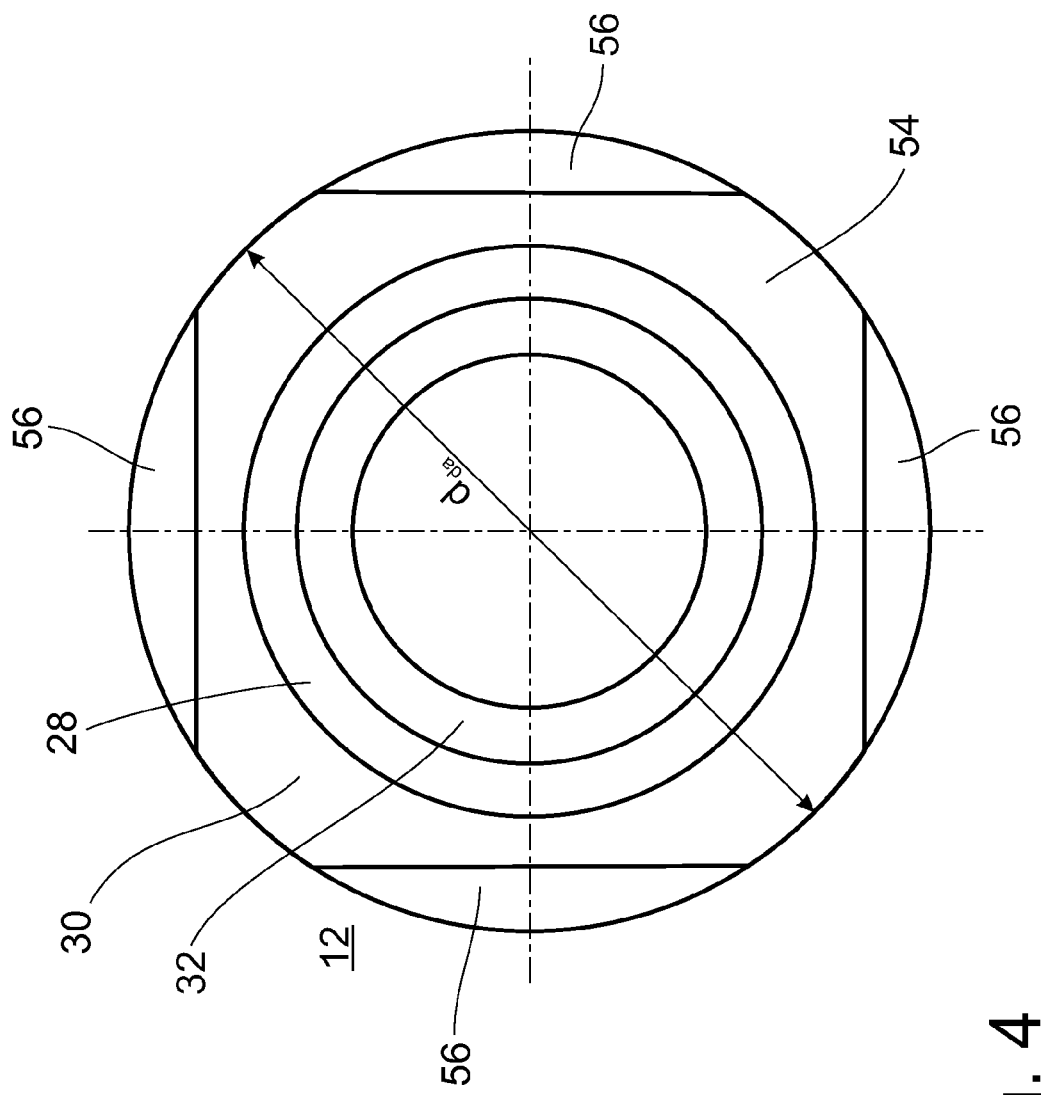
FIG. 4 is a guide portion in cross section.

FIG. 4 shows the valve slide 10 in a top view. The guide 54, which is circular per se, with surface 30 is flattened on four sides so that recesses 56 are formed. These recesses 56 are located between the guide 54 and the valve housing 12 in which the valve slide 10 is movable along the guide 54.

Of course, a quantity of recesses other than four can also be used; regardless of their quantity, the recesses 56 are arranged symmetrically to improve pressure balance.

Figure 5:
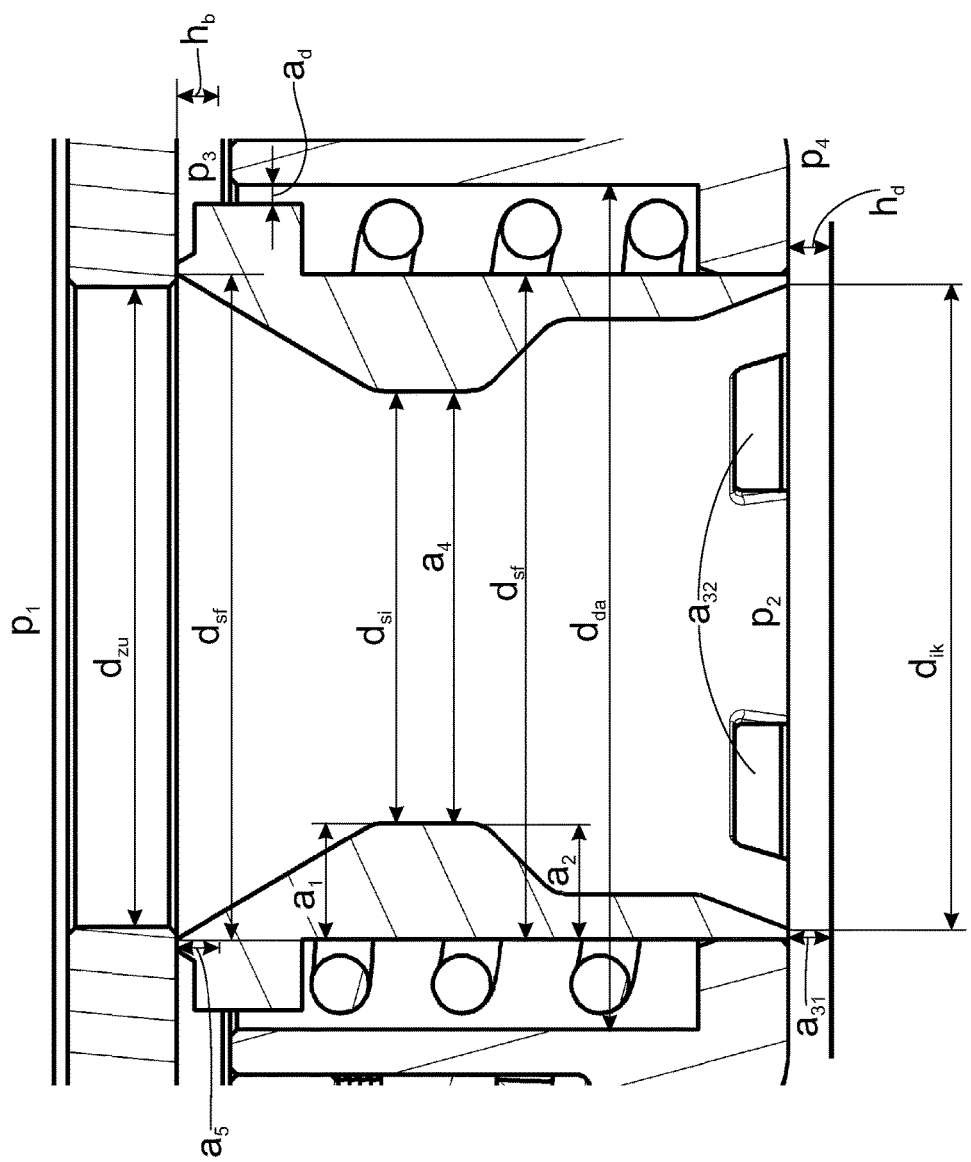
FIG. 5 is a diagram showing the dimensions of a valve slide.

To illustrate the dimensions mentioned with reference to FIG. 2, FIG. 5 shows these dimensions separately from FIG. 2 for the sake of clarity. The indicated diameters have reference characters starting with a "d", while areas are denoted by "a". Of course, the surfaces extending perpendicular to the drawing plane are not depicted as such. The following dimensions are given proceeding from the input side 24:

The vibration damper 1 in which the valve 5 can be installed presents an inlet diameter. The next diameter shown is the inner diameter $d_{sf}$ along the inner edge of surface 28. Both pressure impingement surface $a_1$ and pressure impingement surface $a_2$ can be calculated via this inner diameter $d_{sf}$ depending on inner diameter $d_{si}$. Further, the inner diameter $d_{si}$ predetermines the cross-sectional area $a_4$ of the restriction 40:

$$a_1 = \pi \cdot \left(\frac{d_{sf}}{2}\right)^2 - \pi \cdot \left(\frac{d_{si}}{2}\right)^2$$

$$a_2 = \pi \cdot \left(\frac{d_{sf}}{2}\right)^2 - \pi \cdot \left(\frac{d_{si}}{2}\right)^2$$

$$a_4 = \pi \cdot \left(\frac{d_{si}}{2}\right)^2$$

It should be noted that the first part of the formulas for calculating $a_1$ and $a_2$ correspond because the diameter along the inner edge of surface 28 for calculating $a_1$ and the diameter at the outer edge 50 of surface 52 for calculating $a_2$ are equal because of the structural design of the valve slide 10.

FIG. 5 further shows the outer diameter $d_{da}$, the distance $h_b$ of surface 28 from valve seat surface 29, and the distance $h_d$ from surface 52 to the base of the main flow path 7. Distance $h_b$ represents the height of the opening of the bypass path 6 and distance $h_d$ shows the height of the outlet area $a_{31}$.

Outlet area $a_{31}$ is an annular area which is the product of a circumference and a height. The circumference depends on the diameter $d_{ik}$ defined by the inner edge 48; the height is, as was described above, the distance $h_d$ from surface 52 to the base of the main flow path 7. In the overload position, distance $h_d$ is equal to zero, and it reaches its maximum value in the normal operating position. Accordingly, the outlet area $a_{31}$ can also vary from zero to a maximum value:

$$a_{31} = 2 \cdot \pi \cdot \frac{d_{ik}}{2} \cdot h_d.$$

Outlet area $a_{32}$ designates the area defined by all of the recesses 53. Outlet area $a_{32}$ is that area in the main flow path 7 that is always open for producing a minimum flow. The total cross-sectional area $a_3$ is equal to the sum of areas $a_{31}$ and $a_{32}$.

Outlet area $a_5$ is also an annular area. The circumference which, must be determined, is equal to the inner diameter $d_{sf}$ and the height is equal to distance $h_b$:

$$a_5 = 2 \cdot \pi \cdot \frac{d_{sf}}{2} \cdot h_b.$$

Like distance $h_d$, distance $h_b$ can vary from zero to a maximum value and, of course, the value of distance $h_b$ can be smaller if distance $h_d$ is larger.

$h_b + h_d$ = const.

Of course, this only applies when the flow area at the output side 26 can be varied. On the other hand, in an embodiment in which only the bypass path 6 is opened and closed and the flow area of the main flow path 7 remains constant, the total cross-sectional area $a_3$ is constant, in which case it need not be formed of a plurality of areas.

Outer diameter $d_{da}$ is the outer diameter of the guide 54 at the locations with no recesses 56. This diameter is also shown in FIG. 4. The flow area ad to the lift space or lift/spring space is indicated at a recess 56 in FIG. 5; however, it is equal to the sum of all of the surface areas of the recesses 56.

The cross-sectional area $a_6$ of the pressure limiting valve 20 is shown in FIG. 3 rather than in FIG. 5. Like outlet areas $a_{31}$ and $a_5$, cross-sectional area $a_6$ is an annular area. The height corresponds to the height of the gap opened by the disk package 64, which height can accordingly be varied between zero and a maximum value. The circumference for calculating cross-sectional area $a_6$ is defined by support point 67. Support point 67 is, of course, only a point in cross section; in actuality, it is a support circle.

Figure 6:
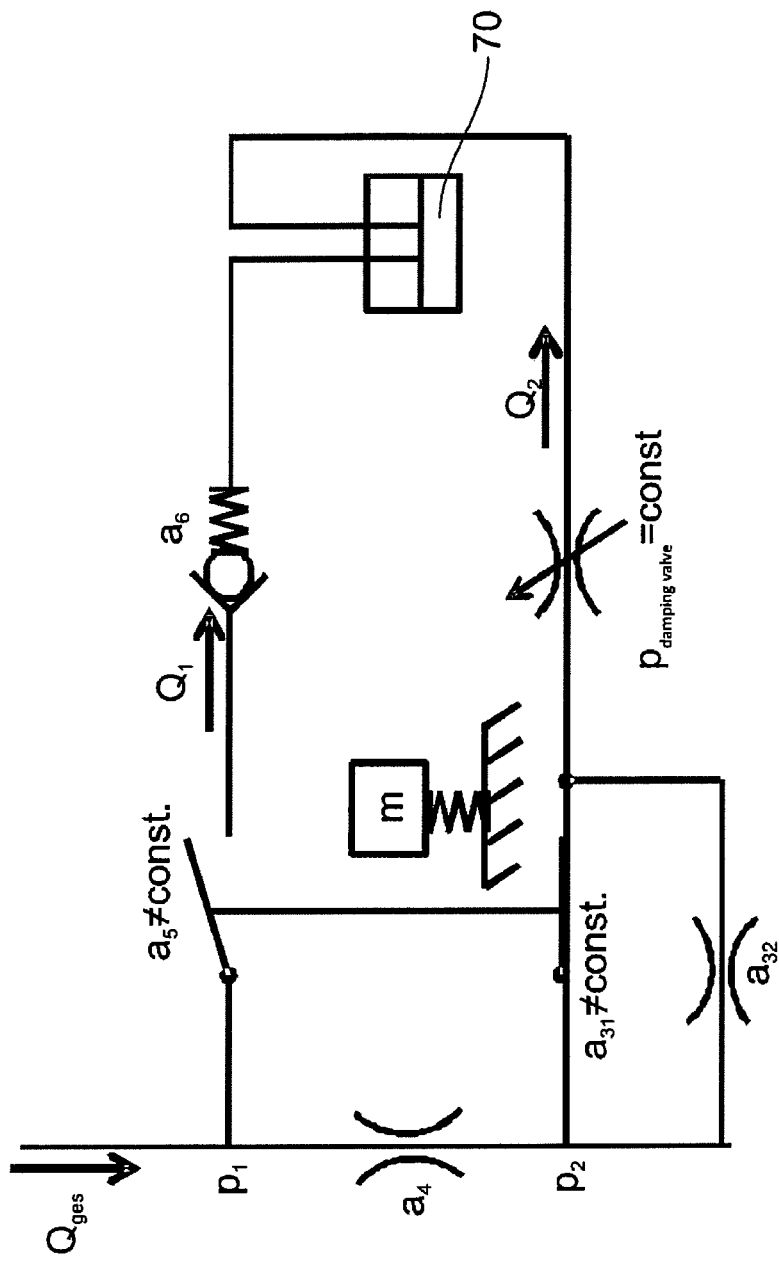
FIG. 6 is a hydraulic circuit diagram.

FIG. 6 shows a hydraulic schematic diagram of the valve according to FIG. 1. The dimensions shown in the drawing correspond to the dimensions which were used in the previous description of the figures. Owing to a piston movement, a total volume flow $Q_{ges}$ is present on the input side 24 of valve 5. The restriction 40 with an area $a_4$ lies between the opening pressure $p_1$ and the closing pressure $p_2$. Area $a_4$ of restriction 40 is evident from inner diameter $d_{si}$.

Following the restriction 40 in the flow path is total cross-sectional area $a_3$ which is given by outlet area $a_{31}$ and outlet area $a_{32}$ in the normal operating position and only by outlet area $a_{32}$ in the overload position. In the overload position, outlet area $a_{31}$ is closed by the valve slide 10. Instead, outlet area $a_5$ which connects the input side 24 and the bypass path 6 is open. Accordingly, at the output side 26 the valve slide 10 has a larger flow area in a first operating position, namely, the normal operating position, and a smaller flow area in a second operating position, namely, the overload position.

It further follows from FIG. 6 that the total volume flow $Q_{ges}$ comprises partial volume flows $Q_1$ and $Q_2$. $Q_1$ is the volume flow flowing in the bypass path 6 and $Q_2$ is the volume flow flowing in the main flow path 7. In the normal operating position, total volume flow $Q_{ges}$ and partial volume flow $Q_2$ are identical, since the bypass path 6 is closed. Further, a compensation space 70 which is not shown in FIGS. 1 to 5 can be seen in FIG. 6. The compensation space 70 fluidically communicates with the interior volume of the inner tube element 2. This receives the fluid volume displaced by the piston rod. Oil is preferably used as fluid; however, the valve 5 may be operated with any incompressible fluid in principle.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve for a vibration damper comprising:
    a valve housing;
    an input side of the valve;
    an output side of the valve;
    a valve slide arranged movably in the valve housing and configured to at least partially close at least one flow path of a fluid flowing through the valve;
    respective pressure impingement surfaces of the valve slide for an opening pressure and for a closing pressure that are substantially equal, and
    a restriction of the valve slide through which a pressure difference between opening pressure and closing pressure can be generated.

2. The valve according to claim 1, wherein the valve slide is pretensioned by a force accumulator.

3. The valve according to claim 1, wherein the restriction is a circular narrowing.

4. The valve according to claim 1,
    wherein the valve slide has a first flow area at the output side in a first operating position, and a second flow area in a second operating position,
    wherein the first flow area is greater than the second flow area.

5. The valve according to claim 4, wherein walls of the valve slide on the output side define at least one recess.

6. The valve according to claim 5, wherein the valve slide at least two symmetrically arranged recesses.

7. The valve according to claim 1, wherein a main flow path configured to be closed by the valve slide is fluidically connected as flow path with the output side of the valve.

8. The valve according to claim 1, wherein a bypass path which can be closed by the valve slide is fluidically connected as a flow path with the input side of the valve.

9. The valve according to claim 8, wherein at least one guide of the valve slide has at least one recess connecting the bypass path and a space in which the at least one guide can be raised and lowered simultaneous with the valve slide.

10. The valve according to claim 8, further comprising a pressure limiting valve is arranged in the bypass path.

11. The valve according to claim 10, wherein the pressure limiting valve is a check valve that is pretensioned in closing direction.

12. A vibration damper for a motor vehicle, comprising:
a valve comprising:
a valve housing;
an input side of the valve;
an output side of the valve;
a valve slide arranged movably in the valve housing and configured to at least partially close at least one flow path of a fluid flowing through the valve;
respective pressure impingement surfaces of the valve slide for an opening pressure and for a closing pressure that are substantially equal, and
a restriction of the valve slide through which a pressure difference between opening pressure and closing pressure can be generated.

13. The vibration damper according to claim 12, wherein the vibration damper comprises:
an inner tube element, a center tube element, and an outer tube element arranged one inside the other; and
a displaceable piston arranged in the inner tube element,
wherein the valve is arranged at or inside the inner tube element,
wherein the center tube element separates a main flow path from a bypass path,
wherein the main flow path and the bypass path are fluidically connected to the interior of the inner tube element.

14. The vibration damper according to claim 13, wherein a damping force generating device is arranged in the main flow path.

15. A motor vehicle comprising a vibration damper comprising:
a valve comprising:
a valve housing;
an input side of the valve;
an output side of the valve;
a valve slide arranged movably in the valve housing and configured to at least partially close at least one flow path of a fluid flowing through the valve;
respective pressure impingement surfaces of the valve slide for an opening pressure and for a closing pressure that are substantially equal, and
a restriction of the valve slide through which a pressure difference between opening pressure and closing pressure can be generated.

16. The valve according to claim 2, wherein force accumulator is a spring.

17. The valve according to claim 4, wherein the first operating position is a normal operating position, and the second operating position is an overload position.

* * * * *